Figure 1:
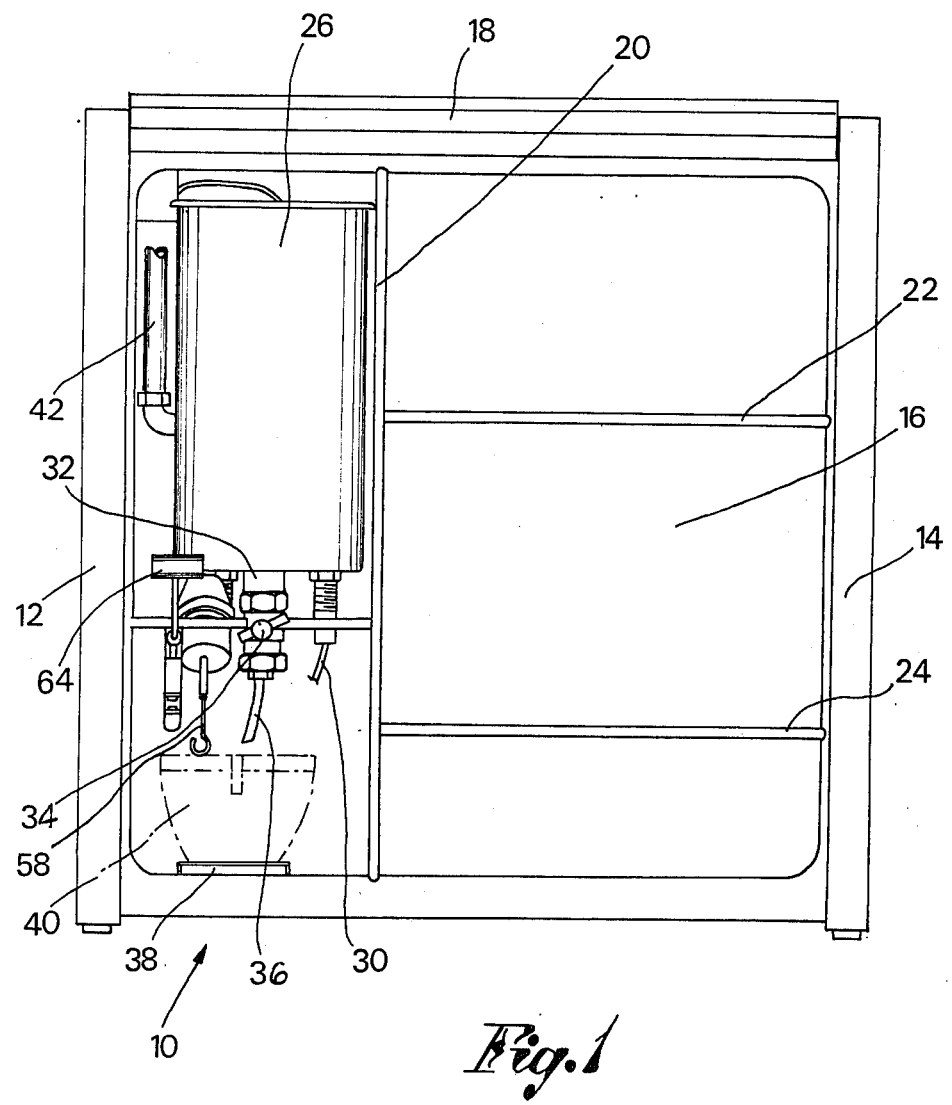

United States Patent [19]

Milani

[11] 4,314,767
[45] Feb. 9, 1982

[54] DISPENSER OF HOT BEVERAGES PREPARED FROM WATER SOLUBLE EXTRACTS

[76] Inventor: Luigi Milani, via Spano 6/16, Turin, Italy

[21] Appl. No.: 119,133

[22] Filed: Feb. 6, 1980

[30] Foreign Application Priority Data

Feb. 6, 1979 [IT] Italy .............................. 67252 A/79

[51] Int. Cl.³ .............................................. B01F 15/06
[52] U.S. Cl. .................................. 366/148; 366/183; 366/286; 366/601
[58] Field of Search ............... 366/183, 289, 148, 302, 366/601, 285, 286; 222/129.3, 129.4, 146 HE, 155

[56] References Cited

U.S. PATENT DOCUMENTS

| | | | |
|---|---|---|---|
| 1,706,190 | 3/1929 | Shroyer | 222/155 X |
| 2,967,433 | 2/1957 | Phillips | 366/285 X |
| 3,927,802 | 12/1975 | Lavochkin et al. | 222/146 HE |

*Primary Examiner*—Stanley H. Tollberg

[57] ABSTRACT

For the purpose of admixing hot water with a water soluble extract the end of a motor driven beating shaft is immersed in and removed from the water contained in a cup during that portion of the cycle of operation when the beating shaft is not rotating. The beating shaft is spring biased on a pivotal arm to a normally raised position. A thermostat controls the heating of the water which is discharged from a tank by means of a spigot.

5 Claims, 3 Drawing Figures

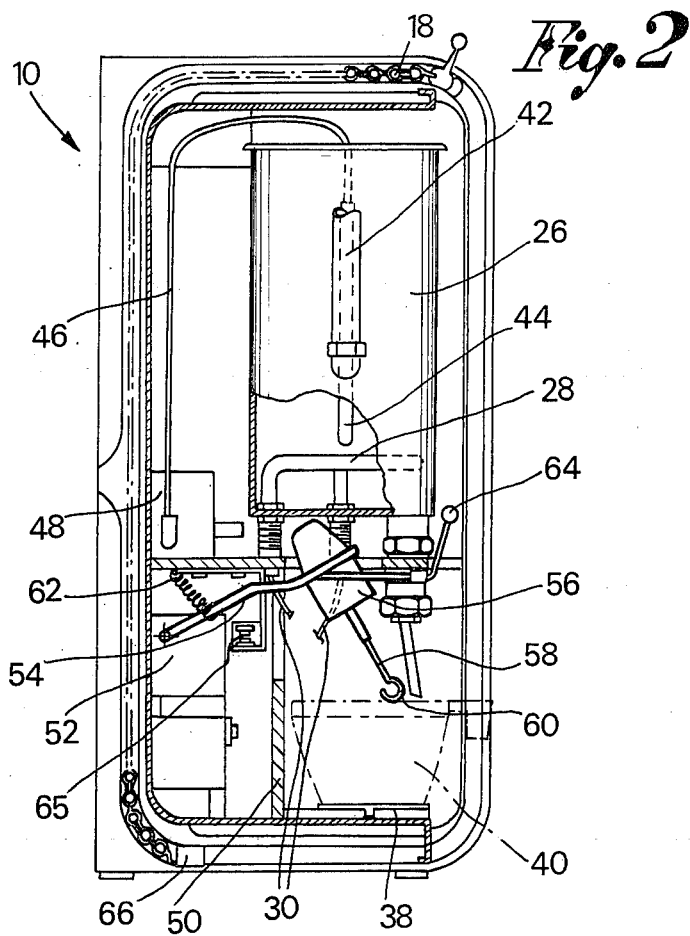
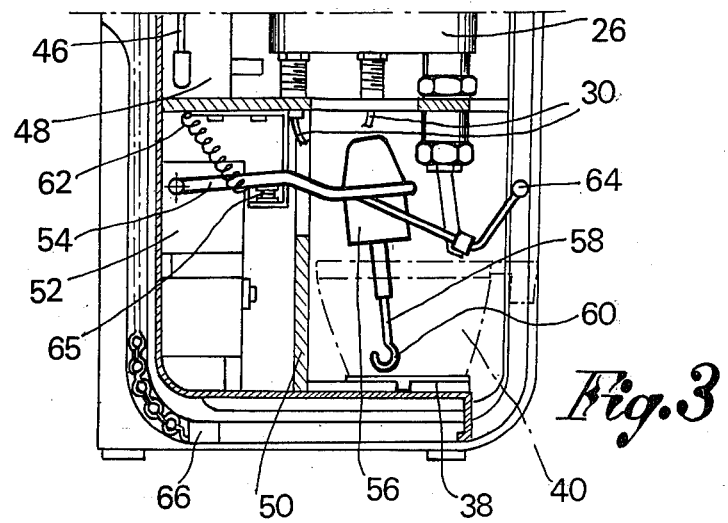

DISPENSER OF HOT BEVERAGES PREPARED FROM WATER SOLUBLE EXTRACTS

The present invention relates to a dispenser of hot beverages prepared by admixing hot water with a water soluble extract such as a lyophilized extract, to obtain beverages such as coffee, tea, hot chocolate, broth and the like.

Several dispensers of hot beverages are known which permit the rapid production of the desired hot beverage starting from various forms of extracts. These dispensers, usually acutated by a token or a coin, are generally considerably cumbersome devices and are, above all, costly. They execute automatically all the operations of retrieving a predetermined dose of extract and a predetermined volume of hot water; of admixing the water with the extract; and of discharging into a cup or other similar container placed in a niche of the dispenser itself. Furthermore, these dispensers normally allow only the production of beverages with fixed dosages, both of extract and of water. In those cases in which it is possible for the user to exercise, a certain degree of selection in the dosage (for example strong coffee or weak coffee, sweet or bitter) the cost of such equipment, as well as the volume occupied thereby become even greater.

In general, therefore, these dispensers of hot beverages are useful only when they are employed by a large number of users, such as for example several dozens, so as to justify the large initial capital investment required in the purchase of equipment.

When instead the number of potential users is limited, such as in the case of a small office, or within a family circle or when the utilization is effected on board vehicles such as trucks, campers, vans and the like, the known dispensers because of their high cost and volume, are totally impractical.

The present invention proposes, therefore, to provide a dispenser for hot beverages prepared from water soluble extracts, which, while offering a smaller degree of automatization in the execution of the required operations, nevertheless occupies a greatly reduced volume as well as having a low relatively manufacturing cost. This combination of features allows the production of very fragrant beverages and at the optimum temperature.

This and other features and advantages of the invention which will be evident from the description of the invention set forth hereinafter, are achieved by means of a dispenser of hot beverages prepared from water soluble extracts that comprises a frame which has a water tank with a heater thermostatically controlled therein with a spout or spigot for the discharge of the water above a ledge supporting a container or cup, and a motor driven beating shaft that is integrally attached to an arm connected to the frame and which is capable of being lowered until the end of the beating shaft is immersed in a cup located on the ledge. A spring is also provided which normally maintains the arm in a raised position so that the raised beating shaft allows the removal of the cup from the ledge.

There will now be described a preferred embodiment of the invention, as an illustrative example, that is not limitative of the invention, and with reference to the attached drawings in which:

FIG. 1 is a front elevational view of a preferred embodiment of the dispenser in accordance with the invention; and FIGS. 2 and 3 are sectional side elevational views of the beater in the raised and lowered positions, respectively.

Referring now to the accompanying drawings, the dispenser of the present invention comprises a base frame including a cabinet 10 having sides 12 and 14 connected to each other by a traverse member 16 which forms the dorsal flooring and ceiling portions of the cabinet. A gate 18 may be retained in an open position as shown in the drawings or it may be lowered so as to close the front of the cabinet. Preferably, the cabinet is provided with a conventional means for attaching it or hanging it on a wall of a room or on the wall of a cab of a vehicle.

The inside of the cabinet is sub-divided by vertical walls or partitions such as 20 and by horizontal planes such as 22 and 24 so as to obtain compartments for the positioning therein of articles such as the containers for the lyophilized extracts (as shown). However, it is to be understood that these compartments may also be omitted and in that case the dispenser will have dimensions somewhat reduced.

On the left side of the cabinet 10, as seen in FIG. 1, there is located the water tank 26 in which there is mounted an electric heater 28 (FIG. 2), known per se, which is fed by means of electrical conductors 30. The container 26 is provided with a lower outlet 32 that is controlled by a spigot 34 which allows the discharge of water through a tube 36. Beneath the tube 36 there is provided a spacing or niche with a supporting ledge 38 for a cup or other container 40 (shown in phantom).

The container 26 is preferably made of stainless steel and is provided with a transparent tubing 42 that is connected laterally so as to serve the purpose of indicating the level of the water in the container 26. Alternatively, the container 26 itself may be constructed of transparent material such as glass or the like so as to allow direct observation of the water level therein.

In the container 26, there is furthermore immersed a thermostatic device 44 connected with conductors 46 to a thermostatic means 48 that is capable of actuating the heater 28 (through connections which are not shown for sake of simplicity) in order to maintain the water in the container 26 at a constant temperature and near the boiling point. The rear portion of the niche for supporting the cup 40 is defined by a partition 50, behind which there is positioned a feeder 52 (which includes a transformer and a bridge, known per se). The feeder 52 supplies the electric power to the entire apparatus.

Furthermore, behind the partition 50 and protruding through a slot therein is an arm 54 that is pivoted on the frame of the cabinet 10. The arm 54 carries on the protruding extremity thereof a beater comprising an electric motor 56 provided with a beating shaft 58 that is folded to define agitating means as shown at 60 at the extremity thereof.

The arm 54 is normally maintained in a raised position by a return spring schematically indicated at 62 and may be rotated downwardly by acting externally on a handle 64 which is integral with the arm 54.

When the arm 54 is raised, the extremity 60 of the beating shaft 58 allows the introduction and removal of a cup or other container in the niche on the ledge 38. Pressing on the handle 64, causes the lowering and consequent immersion of the beating shaft 58 in the liquid container in the cup 40.

In order to automatically cause the initiation of the beating shaft 58 when it is lowered to its downward position, the apparatus comprises a switch with a resilient contact 65 which is normally open and which is capable of closing upon pressure exerted by the arm 54 when this is fully lowered.

In this manner, the immersion of the beating shaft with its respective agitating means 60 into the liquid of the cup occurs when the beating shaft 58 is not yet rotating. This prevents spillage of the liquid when the agitating means 60 traverses the surface of the liquid itself.

On the otherhand, by means of the upward displacement of the beating shaft 58 at the end of the mixing operation, the arm 54 displaces itself from the switch 65 and opens the electrical circuit in the motor 56 while the beating shaft 58 is still immersed in the liquid. However, the beating shaft 58 continues to rotate by inertia while it slows down, even after it is removed from the liquid and this allows the automatic and instantaneous drying of the beating shaft 58 and of the agitator means 60 by centrifugal forces. Because of this, the beating shaft 58 may, immediately after having been used with one liquid, be utilized for admixing a second liquid that may be different from the first one, without danger of introducing any drops of the first liquid into the second.

Preferably, the dispenser of the present invention also comprises a microswitch 66 which is positioned on the cabinet 10 in such a location that it is interrupted when the gate 18 is raised and is connected so as to supply the electrical power from the feeder 52. In this way the dispenser is energized when the gate 18 is open and it is automatically de-energized when the gate 18 is closed. For simplicity reasons the drawings do not illustrate the connecting electrical line from the power source.

The dispenser hereinabove described operates as follows:

It is assumed that the dispenser has been connected to the power source and that the container 26 is filled to the desired level with cold water. When the gate 18 is open, power is applied to the thermostat and the water is rapidly brought to a temperature near its boiling point. At this time, after having placed in a cup 40 a quantity of lyophilized extract and, if necessary, of sugar, the cup 40 is positioned on the ledge 38 and the spigot 34 is opened so as to discharge into the cup 40 the desired quantity of hot water. After closing the spigot 34 the handle 64 is lowered and the contents of the cup 40 is agitated such as by beating for a sufficient time so as to cause the complete solution of the extract in the hot water. The length of time required is variable and depends on the type of extract used. At this time the beverage is ready and the cup 40 may be withdrawn from the niche for utilization thereof. The gate 18 may at this time be lowered so as to shut off the apparatus or it may be left raised in order to keep the apparatus ready to immediately supply a new beverage with the water being maintained continuously at the optimum temperature.

The shaping of the beating shaft 58 has been selected in such a manner that its rotating, agitating extremity 60, although imparting a vortex movement to the liquid sufficient to cause the solution of the extract, does not however, subject the liquid itself to violent motions so as to prevent spillage of the liquid from the cup. For this purpose, the diameter of the agitating means 60 is maintained within a range of a few millimeters. Since the diameter of the agitating means is limited by this measurement, it may assume various shapes such as, for example, a small bar mounted transversely on the extremity of the beating shaft 58, or a small diameter disc positioned at the extremity of the beating shaft 58.

The preferred embodiments described hereinabove have been provided so as to allow the utilization of the dispenser either within a private residence, where an electrical power source is available, or within the other locales such as cabs of trucks, campers and other vans. The dispenser in this case is connected to the 12 volt battery of the vehicle, in which case naturally the transformer incorporated in the power feed applies the necessary voltage to the device directly from the battery circuit. However for the exclusive employment within a domestic residence or within an office, the dispenser may be shaped differently. In other words, it may be more automated in the sense that the container 26 rather than be filled occasionally and manually by the user may be connected directly to the water distribution line by means of an electro-valve actuated by a floating means. In this case the container 26 is always maintained filled with water without the need of intervention on the part of the user. Furthermore, the manual spigot 34 may, in this case, be replaced by another electro-valve that is actuated by a pulsing switch so as to offer greater ease of use. Since these variations are within the normal skill of the artisan it is to be understood that it is superfluous to describe in greater details the variations mentioned hereinabove. These and other modifications and variants of the above described device should be considered to fall within the inventive idea and to be protected by the claims set forth below.

I claim:

1. A dispenser for hot beverages prepared from water soluble extracts, said dispenser comprising a frame containing a water tank having a thermostatically controlled heater and a spigot for discharging heated water into a cup, a motor, a beating shaft coupled to and driven by said motor, an arm coupled to said beating shaft and pivotally coupled to the said frame, means for moving said arm downwardly until one extremity of said beating shaft is immersed in the heated water in the cup, said motor and said beating shaft being controlled by a normally open switch that is actuated by said arm at the end of its downward movement and, a return spring for maintaining said arm in a normally raised position to permit the removal of the cup from the dispenser.

2. The dispenser according to claim 1 wherein said heater is a low voltage heater.

3. The dispenser according to claim 1 further comprising an indicator of the level of the water in the container.

4. The dispenser according to claim 1 wherein the extremity of said beating shaft comprises an eye having a diameter of a few millimeters.

5. The dispenser according to claim 1 wherein said beating shaft is immersed in the water when it is not driven and it removed from the water when it is not driven but is still rotating.

* * * * *